United States Patent
Sadlik et al.

(10) Patent No.: US 9,740,075 B2
(45) Date of Patent: Aug. 22, 2017

(54) METHOD AND SYSTEM FOR PERFORATED REFLECTIVE FILM DISPLAY DEVICE

(71) Applicant: CLEARink Displays, Inc., Santa Clara, CA (US)

(72) Inventors: Bram M. Sadlik, Vancouver (CA); Lorne A. Whitehead, Vancouver (CA); Xiaojia Zhang, Fremont, CA (US)

(73) Assignee: CLEARink Displays, Inc., Fremont, CA (US)

( * ) Notice: Subject to any disclaimer, the term of this patent is extended or adjusted under 35 U.S.C. 154(b) by 440 days.

(21) Appl. No.: 14/482,115

(22) Filed: Sep. 10, 2014

(65) Prior Publication Data

US 2015/0070752 A1 Mar. 12, 2015

Related U.S. Application Data

(60) Provisional application No. 61/876,112, filed on Sep. 10, 2013.

(51) Int. Cl.
*G02B 26/00* (2006.01)
*G02F 1/167* (2006.01)
(Continued)

(52) U.S. Cl.
CPC .......... *G02F 1/167* (2013.01); *G02F 1/13306* (2013.01); *G02F 2001/1676* (2013.01); *G02F 2201/34* (2013.01); *G09G 3/344* (2013.01); *G09G 2300/08* (2013.01)

(58) Field of Classification Search
CPC ............. G02F 1/167; G02F 2001/1678; G02F 2001/1676; G02F 2001/1672; G02F 1/172; G02F 2202/28; G02F 1/13306
See application file for complete search history.

(56) References Cited

U.S. PATENT DOCUMENTS 3,919,031 A 11/1975 White
4,025,674 A 5/1977 Mizuochi
(Continued)

FOREIGN PATENT DOCUMENTS

AT 333109 T 8/2006
CA 2292441 C 7/2002
(Continued)

OTHER PUBLICATIONS

International Search Report and Written Opinion dated Aug. 11, 2014 for PCT Application No. PCT/US14/30966.
(Continued)

*Primary Examiner* — Bumsuk Won
*Assistant Examiner* — Tamara Y Washington
(74) *Attorney, Agent, or Firm* — Dianoosh Salehi (57) ABSTRACT

New reflective display architecture embodiments are disclosed to create specular or paper-like reflectance comprising a transparent outer sheet with an optional light diffusing layer, a rear backplane electrode, a perforated continuous reflective or non-reflective film with a thin conductive reflective or transparent layer acting as a front electrode facing the transparent outward sheet placed between the transparent outward sheet and rear backplane electrode. Other variations include semi-retroreflective or sintered $TiO_2$ layers atop the front electrode. Light is modulated by reflectance or absorbance of the light rays that pass through the transparent outward sheet by movement of light absorbing electrophoretically mobile particles within an optically transparent liquid or air medium. A voltage bias is applied across the medium by a voltage source to move the electrophoretically mobile particles.

22 Claims, 7 Drawing Sheets

(51) Int. Cl.
  *G02F 1/133* (2006.01)
  *G09G 3/34* (2006.01)

(56) References Cited

U.S. PATENT DOCUMENTS

| | | | |
|---|---|---|---|
| 4,071,430 A | 1/1978 | Liebert | |
| 4,203,106 A * | 5/1980 | Dalisa | G02F 1/167 345/107 |
| 4,821,092 A | 4/1989 | Noguchi | |
| 5,019,748 A | 5/1991 | Appelberg | |
| 5,319,491 A | 6/1994 | Selbrede | |
| 5,359,346 A | 10/1994 | DiSanto | |
| 5,396,350 A | 3/1995 | Beeson et al. | |
| 5,596,671 A | 1/1997 | Rowckwell, III | |
| 5,871,653 A | 2/1999 | Ling | |
| 5,959,777 A | 9/1999 | Whitehead | |
| 5,999,307 A | 12/1999 | Whitehead et al. | |
| 6,064,784 A | 5/2000 | Whitehead et al. | |
| 6,215,920 B1 | 4/2001 | Whitehead et al. | |
| 6,304,365 B1 | 10/2001 | Whitehead | |
| 6,376,828 B1 | 4/2002 | Comiskey | |
| 6,377,383 B1 | 4/2002 | Whitehead et al. | |
| 6,384,979 B1 | 5/2002 | Whitehead et al. | |
| 6,437,921 B1 | 8/2002 | Whitehead | |
| 6,452,734 B1 | 9/2002 | Whitehead et al. | |
| 6,574,025 B2 | 6/2003 | Whitehead et al. | |
| 6,751,008 B2 | 6/2004 | Liang et al. | |
| 6,822,783 B2 | 11/2004 | Matsuda et al. | |
| 6,842,279 B2 | 1/2005 | Amundson | |
| 6,865,011 B2 | 3/2005 | Whitehead et al. | |
| 6,885,496 B2 | 4/2005 | Whitehead et al. | |
| 6,891,658 B2 | 5/2005 | Whitehead et al. | |
| 7,046,439 B2 | 5/2006 | Kaminsky et al. | |
| 7,093,968 B2 | 8/2006 | Hsueh et al. | |
| 7,164,536 B2 | 1/2007 | Whitehead | |
| 7,170,670 B2 | 1/2007 | Webber | |
| 7,286,280 B2 | 10/2007 | Whitehead et al. | |
| 7,324,263 B2 | 1/2008 | Johnson et al. | |
| 7,422,964 B2 | 9/2008 | Akiyama | |
| 7,439,948 B2 | 10/2008 | Johnson et al. | |
| 7,463,398 B2 * | 12/2008 | Feenstra | G02B 26/005 345/107 |
| 7,507,012 B2 | 3/2009 | Aylward et al. | |
| 7,515,326 B2 | 4/2009 | Selbrede et al. | |
| 7,564,614 B2 | 7/2009 | Chen et al. | |
| 7,660,509 B2 | 2/2010 | Bryan et al. | |
| 7,740,387 B2 | 6/2010 | Schultz et al. | |
| 7,760,417 B2 | 7/2010 | Whitehead | |
| 7,775,700 B2 | 8/2010 | Lee | |
| 7,852,430 B1 | 12/2010 | Gettmey | |
| 8,022,615 B2 | 9/2011 | Bai et al. | |
| 8,040,591 B2 | 10/2011 | Whitehead | |
| 8,094,364 B2 | 1/2012 | Park | |
| 8,384,659 B2 | 2/2013 | Yeo et al. | |
| 8,587,512 B2 | 11/2013 | Hiji et al. | |
| 8,690,408 B2 | 4/2014 | Li | |
| 9,377,574 B2 | 6/2016 | Li | |
| 2002/0171910 A1 | 11/2002 | Pullen et al. | |
| 2003/0038755 A1 | 2/2003 | Amundson et al. | |
| 2003/0067666 A1 | 4/2003 | Kawai | |
| 2003/0165016 A1 | 9/2003 | Whitehead et al. | |
| 2003/0214697 A1 | 11/2003 | Duthaler et al. | |
| 2004/0136047 A1 | 7/2004 | Whitehead et al. | |
| 2004/0174584 A1 | 9/2004 | Whitehead et al. | |
| 2004/0239613 A1 * | 12/2004 | Kishi | G02F 1/167 345/107 |
| 2006/0056009 A1 | 3/2006 | Kombrekke et al. | |
| 2006/0148262 A1 | 7/2006 | Lee et al. | |
| 2006/0209418 A1 | 9/2006 | Whitehead | |
| 2006/0291034 A1 | 12/2006 | Patry et al. | |
| 2007/0008739 A1 | 1/2007 | Kim et al. | |
| 2007/0019434 A1 | 1/2007 | Lee | |
| 2007/0091434 A1 | 4/2007 | Garner et al. | |
| 2007/0263137 A1 | 11/2007 | Shigeta et al. | |
| 2008/0174852 A1 | 7/2008 | Hirai et al. | |
| 2008/0203910 A1 | 8/2008 | Reynolds | |
| 2008/0219024 A1 | 9/2008 | Mi et al. | |
| 2008/0231960 A1 | 9/2008 | Van Gorkom et al. | |
| 2008/0266245 A1 | 10/2008 | Wilcox | |
| 2008/0285282 A1 | 11/2008 | Karman et al. | |
| 2008/0297496 A1 | 12/2008 | Watson et al. | |
| 2008/0304134 A1 | 12/2008 | Ban | |
| 2009/0109172 A1 | 4/2009 | Lee et al. | |
| 2009/0201565 A1 | 8/2009 | Bita et al. | |
| 2009/0201570 A1 | 8/2009 | Frazier et al. | |
| 2009/0225398 A1 | 9/2009 | Duthaler et al. | |
| 2009/0231714 A1 | 9/2009 | Zhao et al. | |
| 2009/0262083 A1 | 10/2009 | Parekh | |
| 2009/0322669 A1 | 12/2009 | Bryning et al. | |
| 2010/0079843 A1 | 4/2010 | Derichs et al. | |
| 2010/0085627 A1 | 4/2010 | Whitehead | |
| 2010/0091224 A1 | 4/2010 | Cho et al. | |
| 2010/0118383 A1 | 5/2010 | Van Abeelen et al. | |
| 2010/0148385 A1 | 6/2010 | Balko et al. | |
| 2010/0225575 A1 | 9/2010 | Ishii et al. | |
| 2011/0043435 A1 | 2/2011 | Hebenstreit et al. | |
| 2011/0085232 A1 | 4/2011 | Werner et al. | |
| 2011/0273906 A1 | 11/2011 | Nichol et al. | |
| 2011/0299014 A1 | 12/2011 | Jang et al. | |
| 2011/0310465 A1 * | 12/2011 | Takanashi | D04H 1/728 359/296 |
| 2011/0316764 A1 | 12/2011 | Parry-Jones et al. | |
| 2012/0008203 A1 | 1/2012 | Ijzerman et al. | |
| 2012/0019896 A1 | 1/2012 | Yoshida et al. | |
| 2012/0019899 A1 * | 1/2012 | Yeo | G02F 1/167 359/296 |
| 2012/0069064 A1 | 3/2012 | Yamakita | |
| 2012/0081777 A1 | 4/2012 | Heikenfeld et al. | |
| 2012/0113367 A1 | 5/2012 | Kitson et al. | |
| 2012/0113499 A1 | 5/2012 | Komatsu | |
| 2012/0293857 A1 | 11/2012 | Kwon et al. | |
| 2013/0182311 A1 | 7/2013 | Mochizuki et al. | |
| 2013/0278995 A1 | 10/2013 | Drzaic et al. | |
| 2014/0333989 A1 | 11/2014 | Whitehead | |
| 2014/0340376 A1 | 11/2014 | Itagaki et al. | |
| 2015/0146273 A1 | 5/2015 | Whitehead | |
| 2016/0097961 A1 | 4/2016 | Whitehead | |
| 2016/0139478 A1 * | 5/2016 | Whitehead | G02F 1/167 359/222.1 |

FOREIGN PATENT DOCUMENTS

| | | |
|---|---|---|
| CA | 2371138 C | 7/2005 |
| CA | 2410955 C | 1/2007 |
| CA | 2474384 C | 8/2010 |
| CA | 2643808 C | 8/2013 |
| CN | 1173208 C | 10/2004 |
| CN | 1454327 A | 9/2008 |
| DE | 69825894 | 9/2005 |
| EP | 1118039 | 2/2003 |
| EP | 0988573 B1 | 8/2004 |
| EP | 1290486 B1 | 10/2004 |
| EP | 1368700 B1 | 7/2006 |
| JP | 2004085635 | 3/2004 |
| JP | 2007505330 | 3/2007 |
| JP | 3965115 | 6/2007 |
| JP | 2007279641 | 10/2007 |
| JP | 4113843 | 4/2008 |
| JP | 2009251215 | 10/2009 |
| JP | 4956610 | 3/2012 |
| JP | 2005519329 | 6/2017 |
| KR | 100949412 | 3/2010 |
| WO | 03075085 | 9/2003 |
| WO | 2005010604 | 2/2005 |
| WO | WO 2006108285 | 10/2006 |
| WO | 2014146937 | 9/2014 |

OTHER PUBLICATIONS

International Search Report and Written Opinion dated Dec. 30, 2014 for PCT Application No. PCT/US2014/058118.
International Search Report and Written Opinion dated Apr. 3, 2015 for PCT Application No. PCT/US2014/061911.

(56) References Cited

OTHER PUBLICATIONS

International Search Report and Written Opinion dated Oct. 1, 2015 for PCT Application No. PCT/US2015/030349.
International Search Report and Written Opinion dated Mar. 1, 2016 for PCT Application No. PCT/US2015/013725.
International Search Report and Written Opinion dated Jan. 27, 2016 for PCT Application No. PCT/US2015/054385.
International Search Report and Written Opinion dated Mar. 2, 2016 for PCT Application No. PCT/US2015/062075.
International Search Report and Written Opinion dated Apr. 13, 2016 for PCT Application No. PCT/US2015/066980.
International Search Report and Written Opinion dated Apr. 21, 2016 for PCT Application No. PCT/US2016/017416.
International Search Report and Written Opinion dated Mar. 28, 2016 for PCT Application No. PCT/US2015/0066150.
Mossman, M. A. et al., "A Novel Reflective Image Display Using Total Internal Reflection" Displays Devices, Dempa Publications, Tokyo JP vol. 25, No. 5 Dec. 1, 2004 pp. 215-221.
International Search Report and Written Opinion dated Jul. 8, 2014 for PCT Application No. PCT/US13/49606.
International Search Report and Written Opinion dated Sep. 19, 2014 for PCT Application No. PCT/US14/038091.
Gou, S. et al., "Transparent Superhydrophobic Surfaces for Applications of Controlled Reflectance" Applied Optics vol. 51, Issue No. 11, Apr. 10, 2012, pp. 1645-1653.
Whitehead, L. et al., "The Many Roles of Illumination in Information Display" Society for Information Display Symposium (Invited Paper), Issue No. 0097-966X/06/3701-0000, May 2010.
Wong, R. et al., "Electrochemical Threshold Conditions During Electro-Optical Switching of Ionic Electrophorectic Optical Devices" Applied Optics vol. 48, Issue No. 6, Feb. 20, 2009, pp. 1062-1072.
Whitehead, L. et al., "Reflections on Total Internal Reflection" Optics and Photonics News Feb. 2009, pp. 28-34.
Mossman, M. et al., "Observations of Total Internal Reflection at a Natural Super-Hydrophobic Surface" Physics in Canada vol. 64, Issue No. 1, Mar. 2008, pp. 7-11.
Hrudey, P. et al., "Application of Transparent Nanostructured Electrodes for Modulation of Total Internal Reflection" SPIE 2007 Conference Paper No. 6647 Aug. 2007, pp. 1-12.
Hrudey, P. et al., "Variable Diffraction Gratings Using Nanoporous Electrodes and Electrophoresis of Dye Ions" SPIE 2007 Conference Paper No. 6645 Aug. 2007, pp. 1-12.
Webster, A. et al., "Control of Reflection at an Optical Interface in the Absence of Total Internal Reflection for a Retroreflective Display Application" Applied Optics vol. 45, Issue No. 6, Feb. 20, 2006, pp. 1169-1176.
Mossman, M. et al., "Off the Beaten Path with Total Internal Reflection" International Optical Design Conference (Invited Paper), Jun. 2006, pp. 1-12.
Whitehead, L. et al., "Total Internal Reflection for Illumination and Displays" SPIE Newsroom Sep. 7-8, 2006.
Mossman, M. et al., "Controlled Frustration of TIR by Electrophoresis of Pigment Particles" Applied Optics vol. 44, Issue No. 9, Mar. 20, 2005, pp. 1601-1609.
Kwong, V. et al., "Control of Reflectance of Liquid Droplets by Means of Electrowetting" Applied Optics vol. 43, Issue No. 4, Feb. 1, 2004, pp. 808-813.
Mossman, M. et al. "A High Reflectance, Wide Viewing Angle Reflective Display Using Total Internal Reflection in Mirco-Hemispheres" International Display Research Conference, Issue No. 1083-1312/00/2003-0233, Sep. 2003, pp. 233-236.
Mossman, M. et al., "Grey Scale Control of Total Internal Reflection Using Electrophoresis of Sub-Optical Pigment Particles" International Conference of the Society for Information Display, Boston, MA Issue No. 2-0966X/02/3301-0522, May 2002, pp. 522-525.
Coope, R. et al., "Modulation of Retroreflection by Controlled Frustration of Total Internal Reflection" Applied Optics vol. 41, Issue No. 25, Sep. 1, 2002, pp. 5357-5361.
Mossman, M. et al., "New Method for Maintaining Long Term Image Quality in a TIR Based Electrophoretic Display" International Display Research Conference, Nice, France, Eurodisplay Oct. 2002, pp. 851-854.
Mossman, M. et al., "New Reflective Color Display Technique Based on Total Internal Reflection and Subtractive Color Filtering" International Conference of the Society for Information Display, San Jose, CA Issue No. 1-0966X/01/3201-1054, Jun. 2001, pp. 1054-1057.
Whitehead, L. et al., "Visual Applications of Total Internal Reflection in Prismatic Microstructures" Physics in Canada Nov./Dec. 2001, pp. 329-335.
Mossman, M. et al., "A New Reflective Display Based on Total Internal Reflection in Prismatic Microstructures" Proceedings of the 2000 Society for Information Display, International Display Research Conference, Issue No. 1083-1312/00/2001-0311, Oct. 2000, pp. 311-314.

\* cited by examiner

METHOD AND SYSTEM FOR PERFORATED REFLECTIVE FILM DISPLAY DEVICE

The instant application claims the filing-date priority benefit of Provisional Application Ser. No. 61/876,112, filed Sep. 10, 2013, the disclose of which is incorporated herein in its entirety.

FIELD

This application relates to a method, system and apparatus for perforated reflective film display device. Specifically, the embodiments disclosed herein provide for a reflective film display having substantially undisturbed charge distribution between a front and a rear electrode.

BACKGROUND

Figure 1:
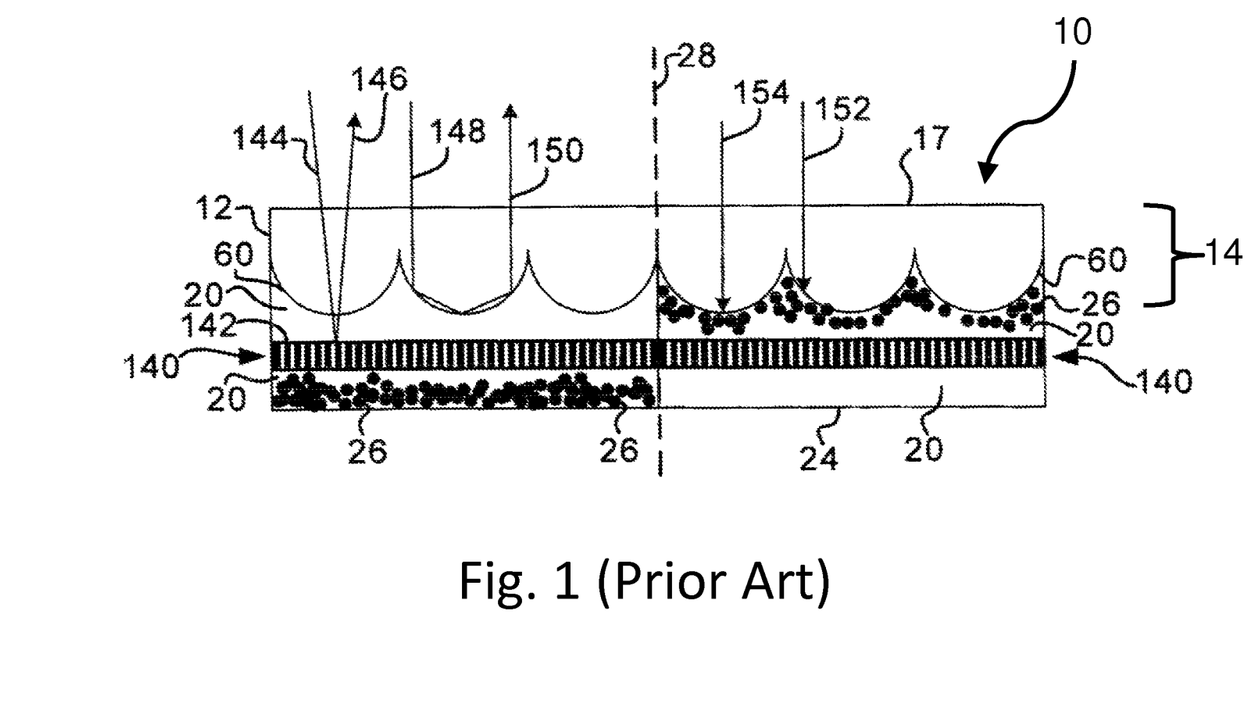
FIG. 1 shows a conventional frustrated or modulated reflective total internal reflection image display.

FIG. 1 shows a conventional frustrated or modulated reflective total internal reflection image display. Specifically, FIG. 1 shows a conventional so-called frustrated or modulated reflective total internal reflection (TIR) image display with a reflective porous membrane of the type described in PCT Application No. WO 2006/108285 A1 and South Korean patent No. 10-0949412. The porous membrane may also be described as a perforated film or an apertured film or combinations thereof. The terms pores, perforations and apertures will be used interchangeably forthwith.

Display 10 includes a transparent outer sheet 12 formed by partially embedding a plurality of high refractive index convex protrusions such as, for example, transparent spherical or approximately spherical beads 14 in the inward surface of a high refractive index polymeric material 12 having a flat outward viewing surface 17 by which a viewer views the display image.

An electrophoresis medium 20 is contained within a reservoir between the portions of beads 14 which protrude inwardly from material 12 and the lower sheet 24. The medium may be an inert, low refractive index, low viscosity liquid such as a fluorinated hydrocarbon. Other liquids may also be used as electrophoresis medium 20. A bead:liquid total internal reflection (TIR) interface is thus formed. Medium 20 may contain a finely dispersed suspension of light absorbing, electrophoretically mobile particles 26.

FIG. 1 also shows reflective, porous, membrane or film 140 disposed between the inward surfaces of hemisphere beads 60 and lower sheet 24 to enhance the brightness of the TIR display. The average diameter of the pores or perforations or apertures in membrane 140 may be substantially greater (e.g., about 10 times greater) than the average diameter of absorptive particles 26. The perforations in film 140 constitute a sufficiently large fraction (e.g., at least 20%) of the total surface area of membrane 140 to permit substantially unimpeded passage of absorptive particles 26 through film 140. Film 140 can be formed of a porous membrane material such as polycarbonate or fiber-weave membrane. Film 140's outward surface 142 is highly reflective, and may be either diffusely or specularly reflective. A suitably reflective membrane or film 140 can be formed from an intrinsically reflective material such as, but not limited to, a multilayer broadband reflector (e.g., Multilayer Optical Film available from 3M®, St. Paul, Minn.) or aluminized Mylar™ flexible film or by coating outward surface 142 with a reflective (e.g. aluminum) film using standard vapor deposition techniques.

In the absence of electrophoretic activity, as is illustrated to the left of dashed line 28 in FIG. 1, the smaller absorptive particles 26 tend to settle through membrane 140's pores, toward lower sheet 24. Reflectance is thus increased and enhanced since incident light rays (e.g., ray 144) which would otherwise have passed through the so-called dark pupil region of the hemisphere beads 60 and would have been absorbed, such as, by the absorptive particles 26 located at the lower sheet 24 are instead reflected (e.g., ray 146) by membrane 140's reflective outward surface 142. Light rays 148 which are incident upon reflective annular regions of the hemisphere beads are totally internally reflected as shown by exemplary ray 150.

When a voltage is applied across medium 20, as is illustrated to the right of dashed line 28 of FIG. 1, absorptive particles 26 are electrophoretically moved through membrane 140's pores to the inward surfaces of hemisphere beads 60. When so moved into this absorptive state, particles 26 absorb light ray 152 which are incident upon the annular regions of the hemisphere beads by frustrating or modulating TIR and also absorb light ray 154 which do not undergo TIR and which would otherwise pass through beads 14. Membrane 140's pores allow absorptive particles 26 to move outwardly into contact with hemisphere beads 60 in the absorptive state and to move inwardly away from hemisphere beads 60 in the reflective state, thus obscuring absorptive particles 26 from direct view in the reflective state.

Figure 2:
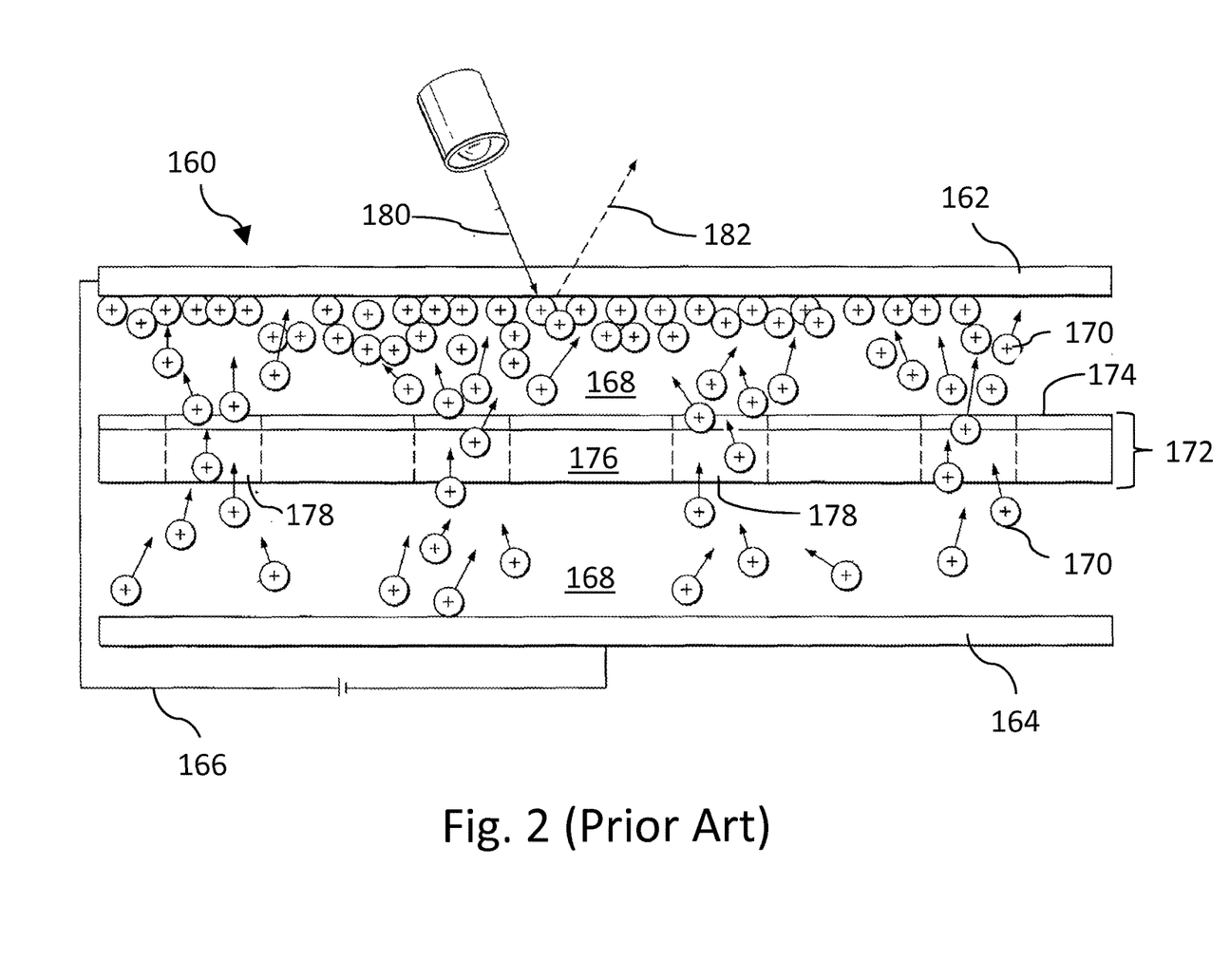
FIG. 2 is a portion of a conventional electrophoretic light modulator.

FIG. 2 illustrates an exemplary prior art electrophoretic light modulator. The electrophoretic light modulator is described in U.S. Pat. No. 8,130,441. The electrophoretic light modulator 160 has an upper viewable surface 162 and a lower surface 164. The upper and lower surfaces further comprise electrode layers where the electrode on the upper surface 162 is transparent. The electrode layers on the upper and lower surface are connected by a voltage source 166. Within the void bordered by the upper 162 and lower surface 164 and electrode layers (not shown) is filled with an electrophoretic fluid 168 further having positively charged electrophoretic particles 170. Also within the void is a perforated sheet 172 with perforations 178 that may allow the particles 170 to pass through and come to rest on the upper surface 162 or lower surface 164 by an applied electrical bias by the electrode layers on the upper and lower surfaces.

By changing the bias of the electrodes, particles 170 may either shield the perforated sheet by resting on the upper surface 162 or may expose the perforated sheet by passing through the perforations 178 in the perforated sheet and resting on the lower sheet 164. The perforated sheet 172 is comprised of a reflective layer 174 to reflect light and support layer 176 where light 180 is incident on the particles 170 resting on the upper surface and mostly absorbed 182 by the particles. The dotted line 182 representing reflected light implies that only a small amount of light is reflected. When particles 170 are moved to the lower surface (not shown), the perforated sheet 172 is exposed thereby allowing light rays to reflect off 182 of the reflective surface 174. In this situation, reflected light 182 would be of much higher intensity and creating a light state of the display.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

In one embodiment, the disclosure relates to a light modulating reflective (i.e. front-lit) display architecture having a perforated, continuous film with: 1) an electrically conductive electrode layer, 2) a reflective, electrically conductive electrode layer, or 3) a reflective layer and a second electrically conductive electrode layer. The display architectures described herein comprise light absorbing, electrophoretically mobile particles suspended in an optically clear medium. Light is reflected by the multi-layered perforated film structure or absorbed by the mobile particles after passing through a transparent sheet to control image display.

Each of the conventional systems of FIGS. 1 and 2 includes a reflective perforated or porous sheet positioned between a front and rear surface where each surface includes an electrode layer with the front electrode layer being transparent. Alternative display architectures with distinct advantages over the conventional architecture is provided herein where light passes through an outward (i.e., front) transparent sheet and is reflected by a multilayered perforated membrane or film structure disposed between the front and rear sheets. In one embodiment, an electrically conductive layer may define the front electrode.

In one embodiment of the disclosure, the transparent front electrode is located on the perforated film. The reflected light may be modulated by directly covering and uncovering the surface of the multilayered porous membrane structure with electrophoretically mobile, light absorbing particles in the presence of an applied electrical bias. In an alternative embodiment, the particles may be light scattering and the porous film surface may be light absorbing and electrically conducting. An electrical bias may be applied between the front electrode and an electrically conductive layer such that a thin film transistor, or direct drive patterned array coated onto a rear support sheet, may define the rear electrode. The movement of particles between the front and rear electrodes creates light and dark pixels in pre-determined combinations that create images to display and convey information.

The disclosed embodiments provide many advantages. First, the underside of the front viewable surface is no longer a conductive surface which translates to lower manufacturing cost and a brighter display as any transparent electrode will inherently impede light transmission. Second, simple reflective materials such as aluminum coatings may be applied to the perforated reflector film. This coating may be both reflective and conductive to form an equipotential surface within the cell. Aluminum coatings may comprise some of the lower cost alternatives. Third, the electric fields within the cell are closely controlled and are easily reproducible within the new architecture allowing for predictable display performance.

In the conventional architecture, a metal perforated reflector film is an equipotential surface which is uncontrolled and can take any value of voltage between the voltages in the top and bottom electrodes. The precise voltage depends on the charge distribution across the entire cell. Having variable voltage on an unconnected electrode means that the cell performance will have variable operation speeds and hysteresis. Experience has shown that such architecture renders the device inoperable. One solution to the conventional architecture's shortcomings is to use a multi-layer dielectric mirror stack on top of the perforated reflective film.

The following specification is divided into sections A-D. Each section describes an exemplary embodiment of a reflective display comprising a multi-layered porous or perforated reflective film structure. Each has operational and visual benefits as described in the preceding paragraphs.

Section A—Perforated Film with Conductive, Reflective Electrode Layer—

Figure 3:
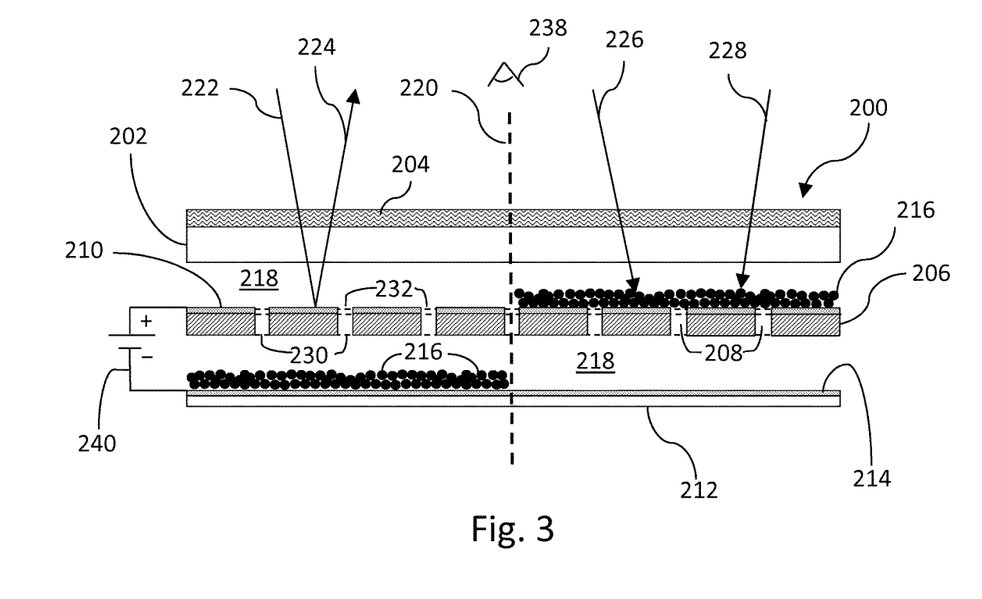
FIG. 3 is a cross-sectional view of a reflective display architecture according to a first exemplary embodiment of the disclosure.

FIG. 3 is a cross-sectional view of a reflective display according to one embodiment of the disclosure. In FIG. 3, display 200 includes a first transparent outward sheet 202 through which the viewer 238 views the display. A second layer 204 lies on top of the transparent outward sheet 202 and resides between the viewer 238 and outward sheet 202. Second layer 204, also known as a light diffusing layer, may be optionally added to diffuse or spread the light rays as they enter and/or exit the display 200. Layer 204 may be optionally included if it is desired to have a display that reflects light in a more Lambertian-like distribution where the reflection of the light may appear paper-like as opposed to reflection of light rays in a more specular-like fashion.

In one application, layer 204 may be tuned with respect to the desired display optical properties. For example, it may not be desirous to have a purely Lambertian distribution at the surface as most of the light will be reflected at the surface preventing light rays from entering the display and absorption by light absorbing, electrophoretically mobile, particles leading to a poor dark state. Instead, it may be desirous to have a light diffuser layer 204 that creates only a slight Lambertian effect to soften the reflected light and to have a more paper-like reflectance yet have a high contrast dark state.

It may also be desirable to retain the diffusion level not so high as to cause pixel or sub-pixel cross-talk. For example, if light enters through one sub-pixel it should exit through the same sub-pixel, otherwise the contrast and/or color saturation will be reduced. The light diffusing layer 204 may be one or two sided. The application of the display will determine whether or not a light diffuser layer is desired and the type and material of construction of the diffuser layer. There are a number of possibilities for the materials of construction for the light diffusing layer such as ground, grey-eyed or opal glass diffusers and Teflon™ or other types of common polymeric diffusers. Another embodiment of the light diffusing material that may be used is a sheet comprising of convex protrusions such as in the shape of, but not limited to, hemispheres where the protrusions are facing outward toward the viewer and adjacent the porous membrane 206. The outward facing sheet of convex protrusions may have an index of at least about 1.4 and comprised of polycarbonate or some other polymer-based material.

In another embodiment, the outward transparent sheet 202 and the light diffusing layer 204 define a single integrated sheet and not a combination of two separate sheets as shown in FIG. 3. A single sheet may be used where the inner surface of the sheet facing away from the viewer may be have a smooth, non-light diffusing surface while the outer surface may have a light diffusing structure or textured surface to redirect light in a Lambertian-like manner. In still another embodiment, the single outward sheet may include an inner light diffusing surface facing away from the viewer 238 while the outward surface facing the viewer 238 may have a smooth, non-light diffusing, surface. In yet another embodiment, the single outward sheet may comprise of a light diffusing inner and outward surfaces. The following description of the display 200 can be considered to consist of having a single non-light diffusing transparent sheet, a single light diffusing sheet, a combination of a single transparent sheet 202 and light diffusing layer 204 or a single sheet comprising of both. For illustrative purposes the outward or front transparent sheet 202 and light diffusing layer 204 are shown as separate layers. It is noted, however, that the disclosed principals are not limited thereto.

Display 200 of FIG. 3 also includes a rear support 212. Rear support 212 may further include a rear electrode layer 214 comprising of a thin film transistor or a direct drive patterned electrode array. The display may also comprise a passive matrix array of electrodes. The patterned electrode array may be an electrically conductive material such as indium tin oxide (ITO), Baytron™, metallic nanoparticles dispersed in an optically clear polymer film or a thin metal layer such as aluminum, silver or other conductive material.

Contained within the cavity formed by transparent outward sheet 202 and the rear electrode 214 is an optically transparent liquid or air medium 218. In one embodiment, medium 218 is optically transparent. In another embodiment, medium 218 may be colored using dyes or other colorants. Light absorbing, electrophoretically mobile, particles 216 are suspended within medium 218.

Display 200 also includes thin, perforated, contiguous (represented by the dotted lines 230) film or membrane 206. Membrane 206 may be disposed within the cavity formed between transparent sheet 202 and rear electrode 214. Film 206 may be formed of a track etched polymeric material such as polycarbonate, polyester, polyimide or some other polymeric material or glass. In an exemplary embodiment, film 206 has a thickness of at least about 10 microns. The perforated nature of film 206 allows particles 216 to pass through perforations (interchangeably, pores) 208. In an exemplary embodiment, the average diameter of perforations 208 is substantially greater (e.g., 10 times) than the average diameter of particles 216. Pores 208 in film 206 may constitute a sufficiently large fraction (e.g., at least 10%) of the total surface area of film 206 to permit substantially unimpeded passage of particles 216 through film 206.

Display 200 is also shown with a second front electrode layer 210. Layer 210 may be reflective and contiguous (represented by the dotted lines 232) and may be located on top of perforated film 206. In one embodiment, layer 210 is positioned adjacent transparent sheet 202. Layer 210 may be a thin, light reflective, metal layer such as aluminum, silver, gold, aluminized Mylar™ flexible film or other similar material. Front electrode 210 may be assembled by coating film surface 206 with a reflective (e.g., aluminum, silver, gold) metallic film using conventional vapor deposition techniques.

In an alternative embodiment, reflective and conductive layer 210 may be formed on film 206 from a two-layer approach. For example, an intrinsically reflective material such as a multilayer broadband reflector (e.g., Multilayer Optical Film available from 3M®, St. Paul, Minn.) coated with a top transparent conductive layer such as ITO or Baytron™ may be an option. A switchable voltage can be applied across medium 218 containing particles 216 via electrodes 210 and 214. When a pixel of display 200 is switched into the light absorbing or dark state as depicted to the right of the dotted line 220, a biased voltage is applied by voltage source 240 such that particles 216 are electrophoretically moved through the pores 208 toward electrode 210. In this state, particles 216 are attracted to and collect at the surface of second front electrode 210 (adjacent transparent sheet 202 and facing the viewer 238) such that light rays 226, 228 passing through transparent sheet 202 are absorbed by particles 216.

When the voltage is reversed such that a pixel of display 200 is switched into the light reflecting or light state as depicted on the left side of the dotted line 220, particles 216 are moved through the pores 208 towards the rear electrode surface 214 where they collect at surface 214 (adjacent to the backside of the perforated membrane 206 and away from the viewer sight). While particles 216 are located at the rear electrode surface 214, incident light rays 222 are reflected back to the viewer (as depicted by ray 224) thereby creating a light state for the pixel. The process described herein to switch pixels of display 200 between a light and dark state can be repeated by reversing the voltage to move particles 216 between front electrode 210 and rear electrode 214.

Figure 4:
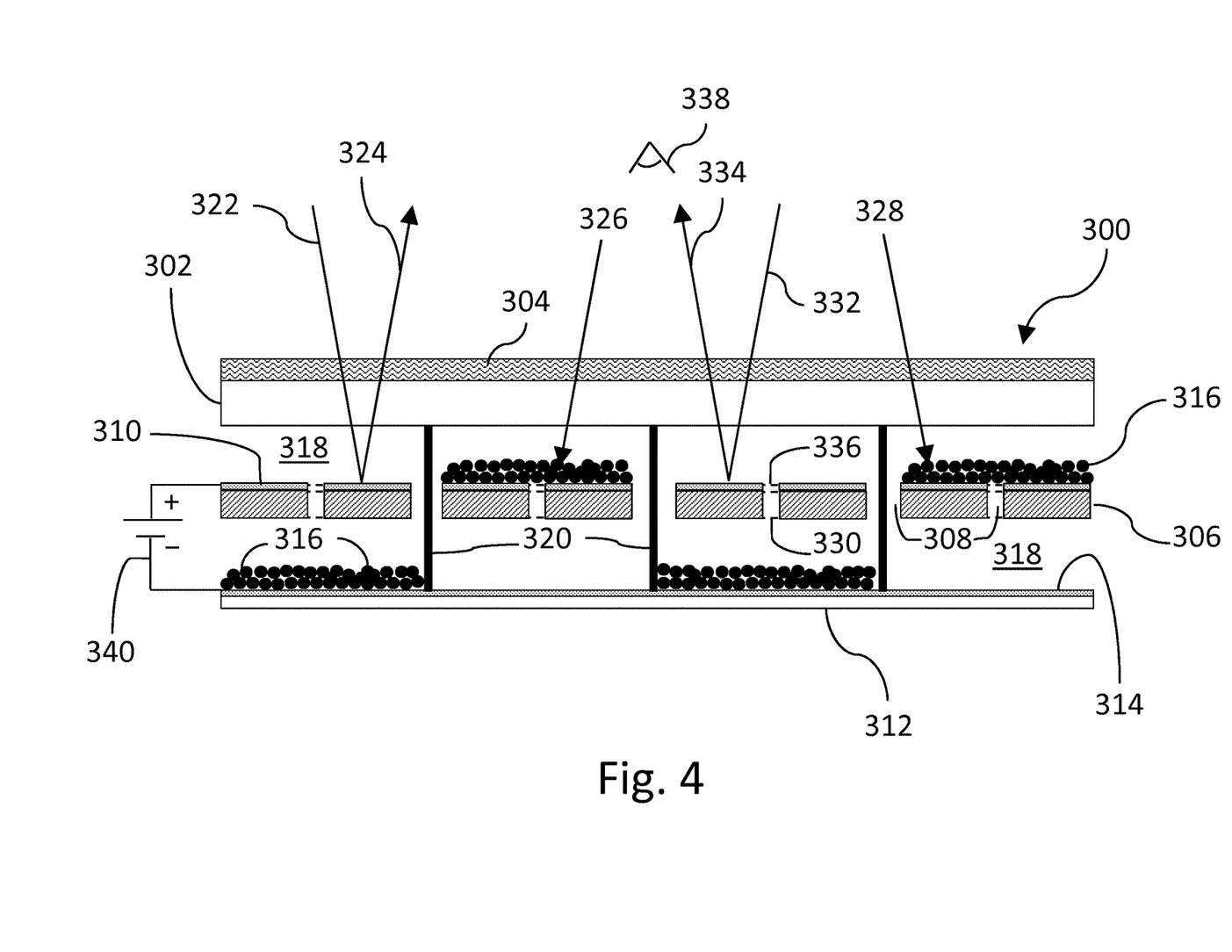
FIG. 4 is a cross-sectional view of a reflective display architecture according to a second exemplary embodiment of the disclosure.

FIG. 4 is a cross-sectional view of a reflective display architecture according to a second exemplary embodiment of the disclosure. Display 300 is shown with a transparent outer sheet 302 facing viewer 338, second (optional) light diffusing layer 304, perforated contiguous film 306 (as depicted by dotted lines 330) with perforations 308, a perforated, reflective, contiguous (depicted by the dotted lines 336) conductive layer 310 acting as a front electrode. Display 300 also includes rear support 312 having of top conductive layer 314 (acting as the rear electrode) in a thin film transistor or direct drive patterned electrode array. Display 300 is also shown with an optically clear liquid or air medium 318 filling the cavity formed between rear electrode 314 and outward transparent sheet 302 with suspended light absorbing electrophoretically mobile particles 316 and a voltage source 340.

Display 300 may also comprise a passive matrix array of electrodes. Display 300 further comprises walls 320 that create wells or compartments to separate single or multiple pixels in the display. Walls 320 may be configured to create wells or compartments in square, rectangular, triangular, pentagonal, hexagonal pixel shapes or any combinations thereof. Walls 320 may include a polymeric material and patterned by such techniques as photolithography, embossing or molding. Walls 320 help confine particles 316 to prevent settling and migration of particles 316 which may lead to poor display performance over time.

The single or multiple pixels may be switched within the wells or compartments formed by the cross walls 320. For example, light rays 322 and 332 pass through the transparent outer sheet 302 and optional light diffusing layer 304 and are reflected as reflected light rays 324 and 334, respectively, at conductive layer 310 to create a light state. A voltage may be applied from a voltage source 340 such that particles 316 are moved through perforations 308 of membrane 306 and collect on the surface of rear electrode 314. The voltage may be reversed to move particles 316 from the rear electrode 314 through the perforations 308 of membrane 306 and to cover the surface of reflective front electrode 310. In this manner, light rays 326 and 328 are absorbed or scattered by particles 316 at single or multiple pixels located within the well compartments of cross walls 320 to create a dark state.

Section B: Reflective Perforated Film with Transparent Electrode Layer—

Figure 5:
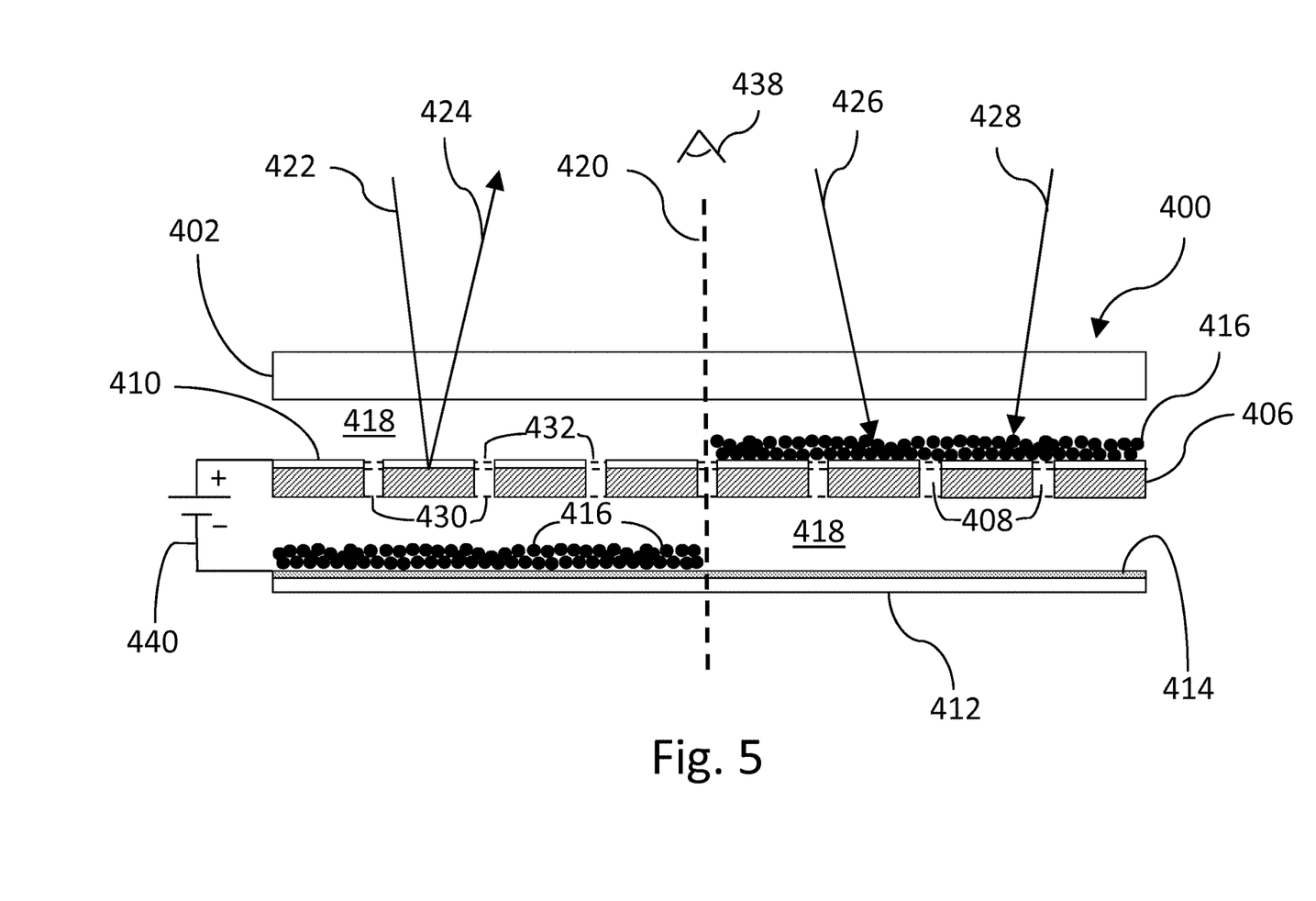
FIG. 5 is a cross-sectional view of a reflective display architecture according to a third embodiment of the disclosure.

FIG. 5 is a cross-sectional view of a reflective display architecture according to a third embodiment of the disclosure. In FIG. 5, display 400 includes a first transparent outward sheet 402 through which viewer 438 views the display. Display 400 also includes, a perforated sheet 406, a rear support 412 comprising of a top conductive layer 414 acting as a rear electrode in a thin film transistor or direct drive patterned electrode array, an optically clear liquid or air medium 418. Medium 418 fills the cavity formed between rear electrode 414 and outward transparent sheet 402 with suspended light absorbing electrophoretically mobile particles 416. Display 40 also includes a voltage source 440. Display 400 may also include a passive matrix array of electrodes.

Display 400 is similar in design to the embodiment of FIG. 3. In contrast to display 200 depicted in FIG. 3, the perforated, continuous film or membrane 406 (shown by dotted lines 430) with perforations 408, is white and reflective to give a paper-like reflectance. The white reflective perforated film may comprise Teflon or other similarly white opaque polymer to give a paper-like reflectance. The perforated, contiguous (represented by the dotted lines 432 to imply a continuous layer) layer 410 acts as a front electrode on top of the perforated, contiguous film 406 is transparent to light instead of being reflective. ITO or Baytron™ or metallic nanoparticles dispersed in an optically transparent polymer could be used as the transparent front electrode 410.

In this display 400, light is not reflected by front electrode layer 410. Instead, light passes through layer 410 and is reflected by the white perforated, continuous film 406. In one embodiment, the level of diffuse reflectance from membrane 406 is not so high as to cause pixel or sub-pixel cross-talk. For example, if light enters through one sub-pixel it should be reflected by film 406 such that light exits through the same sub-pixel, otherwise the contrast and/or color saturation will be reduced.

A switchable voltage may be applied by voltage source 440 across medium 418 containing the light absorbing electrophoretically mobile particles 416 via electrodes 410 and 414. When a pixel is switched into the light absorbing (dark state) as depicted to the right of the dotted line 420, a voltage bias may be applied such that particles 416 are moved through the perforations 408 of film 406 toward electrode 410. In this state, particles 416 are attracted to and collect at the surface of electrode 410 and adjacent the transparent sheet 402. The particles face viewer 438 such that when light rays 426 and 428 pass through the transparent sheet 402 they are absorbed by particles 416. When the voltage is reversed such that a pixel of display 400 is switched into the light reflecting or light state as depicted on the left side of the dotted line 420, particles 416 are moved through apertures 408 of film 406 towards the rear electrode surface 414. The particles collect at surface 414 adjacent to the backside of film 406 and away from the viewer sight 438. While particles 416 are located at rear electrode 414, incident light rays 422, pass through electrode 410 and are reflected back to viewer 438 by film 406 as schematically shown by ray 424. This creates a light state for the pixel. The process of switching display 400 between light and dark states may be repeated by reversing the voltage. Rear electrode 414 may include a TFT or a direct drive patterned array. The display may comprise a passive matrix electrode array.

Though not shown, display 400 may also include walls as discussed in relation to FIG. 4. The walls may create wells or compartments that separate single or multiple pixels in the display. The walls or cross walls may be designed to create wells or compartments in various geometrical shapes. The walls may comprise a polymeric material and patterned by such techniques as photolithography, embossing or molding. The walls can help confine particles 416 to prevent settling and migration of the particles which leads to poor display performance.

Section C: Perforated Film with Reflective Electrode and Semi-Retro-Reflective Layers—

Figure 6:
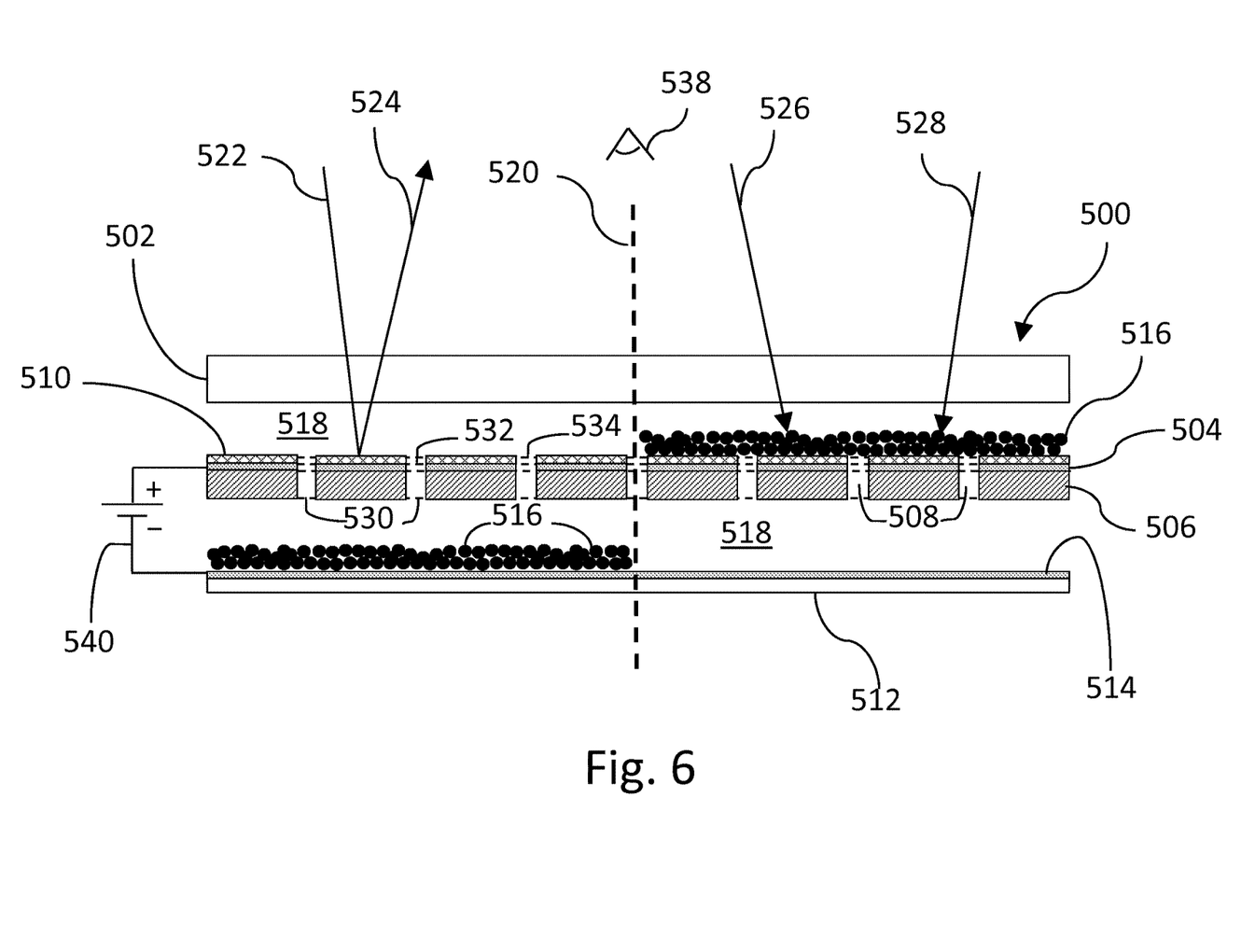
FIG. 6 is a cross-sectional view of a reflective display architecture according to a fourth embodiment of the disclosure.

FIG. 6 is a cross-sectional view of a reflective display architecture according to a fourth embodiment of the disclosure. Display 500 of FIG. 6 includes a first transparent outward sheet 502 through which viewer 538 views the display. Display 500 also includes a porous, contiguous film 506 (shown by dotted lines 530) with perforations 508, a porous, reflective, continuous (represented by the dotted lines 532) electrically conductive layer 504 acting as a front electrode on top of the porous, continuous film 506. Rear support 512 includes top conductive layer 514 which may act as a rear electrode in a thin film transistor or patterned electrode array. An optically clear liquid or air medium 518 fills the cavity formed by rear electrode 514 and outward transparent sheet 502 with suspended light absorbing electrophoretically mobile particles 516. As with prior embodiments, voltage source 540 is provided to modulate power to the electrodes.

Display 500 may also comprise a passive matrix array of electrodes. Display 500 has several distinguishing features. In contrast to display 200 of FIG. 3, display 500 includes an additional second porous and contiguous (represented by the dotted lines 534) layer 510 on top of the porous, continuous (represented by the dotted lines 532) conductive first layer 504. Layer 510 is formed on top of front electrode 504 and porous, continuous film 506. Second layer 510 may be comprised of a semi-retro-reflective coating. The semi-retro-reflective coating may comprise corner-cube or partial corner-cube reflectors and glass beads embedded in a reflective substrate such as the reflective front electrode 504 or in a transparent matrix and backed by the reflective front electrode 504.

In one embodiment, the level of diffuse reflectance from semi-retro-reflective coating 510 is not so high as to cause pixel or sub-pixel cross-talk. For example, if light enters through one sub-pixel it should be reflected by semi-retro-reflective coating 510 such that light exits through the same sub-pixel, otherwise the contrast and/or color saturation will be reduced.

A switchable voltage may be applied by voltage source 540 across medium 518 containing particles 516. The voltage may be applied via electrodes 504 and 514. When a pixel of display 500 is switched into the light absorbing or dark state as depicted to the right of the dotted line 520, a voltage bias may be applied such that particles 516 are electrophoretically moved through the pores 508 of membrane (interchangeably, film) 506 toward front electrode 504. In this state the particles 516 are attracted to and collect at the surface of semi-retro-reflective surface 510, adjacent the transparent sheet 502 and facing the viewer 538. When light rays 526 and 528 pass through the transparent sheet 502, they are absorbed by particles 516.

When the voltage is reversed such that a pixel of display 500 is switched into the light reflecting or light state as depicted on the left side of the dotted line 520 in FIG. 6, particles 516 are moved through the perforations 508 of film 506 towards the rear electrode surface 514. The particles collect at surface 514 adjacent to the backside of the film 506 away from the sight of the viewer 538. While particles 516 are located at rear electrode surface 514, incident light rays, shown by incident light ray 522, are reflected back to the viewer 538. The reflection is caused by a combination of the semi-retro-reflective porous and continuous layer 510 and reflective front electrode layer 504. The reflected light is shown by ray 524 which creates a light state for the pixel. The process described herein to switch pixels of display 500 between light and dark states may be repeated by reversing polarity and moving particles 516 between the semi-retro-reflective surface 510 and rear electrode 514. Rear electrode 514 may be comprised of a TFT or direct drive patterned electrode array or part of a passive matrix grid array.

Display 500 may further includes walls as shown in display 300 in FIG. 4 to form wells or compartments for separating single or multiple pixels in the display. The walls or cross walls may be designed to create wells or compartments in variety of desired shapes. The walls may be formed from a polymeric material and patterned by such techniques as photolithography, embossing or molding. The walls may help confine particles 516 and prevent settling and migration of the particles which lead to poor display performance.

Section D: Reflective Perforated Film with Electrode and Sintered $TiO_2$ Layers—

Figure 7:
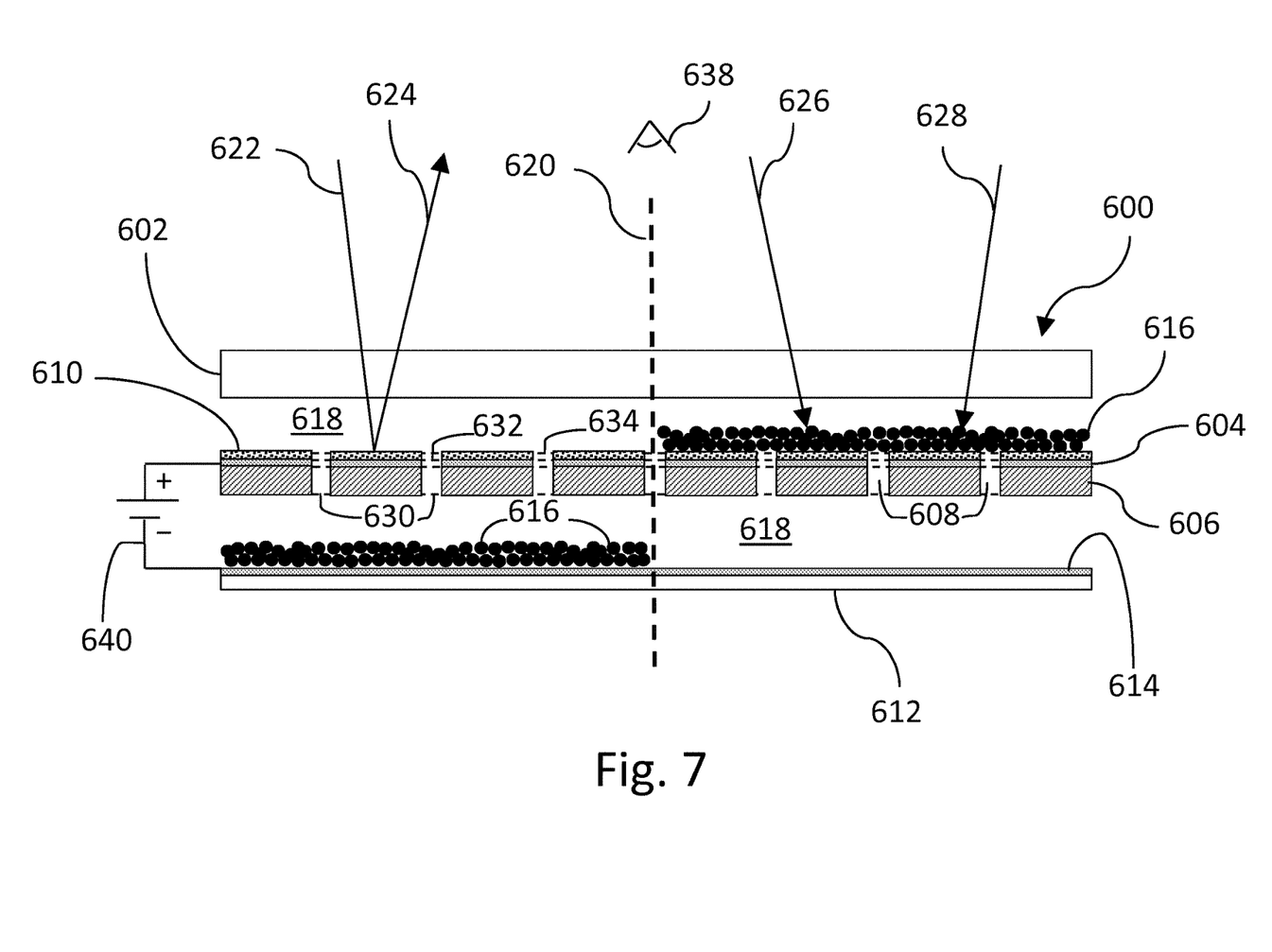
FIG. 7 is a cross-sectional view of a reflective display architecture according to a fifth exemplary embodiment of the disclosure.

FIG. 7 is a cross-sectional view of a reflective display architecture according to a fifth exemplary embodiment of the disclosure. Display 600 of FIG. 7 includes first transparent outward sheet 602 through which viewer 638 views the display. Display 600 also includes perforated, contiguous or continuous film or membrane 606 (continuous nature of the film are represented by dotted lines 630) with perforations 608, a perforated, contiguous (represented by the dotted lines 632) conductive layer 604 acting as a front electrode on top of the perforated, continuous film 606. Display 600 is also shown with rear support 612 comprising top layer 614 acting as a rear electrode in a thin film transistor or patterned electrode array, an optically clear liquid or air medium 618 filling the cavity formed by rear electrode 614 and outward transparent sheet 602 with suspended light absorbing electrophoretically mobile particles 616 and voltage source 640.

Display 600 may define a passive matrix array of electrodes. Display 600 of FIG. 7 has some distinguishing features over display 200 of FIG. 3. For example, display 600 may include an additional second perforated and continuous (represented by dotted lines 634) layer 610 on top of the perforated (represented by dotted lines 632) first layer 604 acting as a front electrode on top of the perforated membrane 606.

Second layer 610 may include a white perforated reflective coating such as sintered $TiO_2$ particles. Sintered $TiO_2$ layer may reflect light in a paper-like manner. The sintered $TiO_2$ particle coating 610 may include two scales of porosity. A first scale of porosity may have a larger scale porosity of the film for which the perforations are sufficiently large that light absorbing particles 616 may pass unimpeded through perforations 608 responsive to an applied bias. A second scale may have a smaller scale porosity of the sintered $TiO_2$ for which the perforations are smaller than particles 616 but are sufficiently large that suspension fluid 618 makes good contact with the front electrode 604, thus providing a continuous desired electric field path between front electrode 604 and rear electrode 614.

In addition, front electrode 604 may be either transparent (e.g., ITO or Baytron™ or metallic nanoparticles in a polymer matrix) or reflective (e.g., metallic) since light is entirely reflected at sintered $TiO_2$ surface 610. In one embodiment, the level of diffuse reflectance from $TiO_2$ surface 610 is not so high as to cause pixel or sub-pixel cross-talk. For example, if light enters through one sub-pixel it should be reflected by $TiO_2$ surface 610 such that light exits through the same sub-pixel, otherwise contrast and/or color saturation will be reduced.

A switchable bias may be applied by a source 640 across medium 618 containing particles 616 via electrodes 604 and 614. When a pixel of display 600 is switched into the light absorbing or dark state as depicted to the right of the dotted line 620, a voltage or electric field is applied such that particles 616 are electrophoretically moved through perforations 608 of film 606 toward electrode 604. In this state, particles 616 may be attracted to and collect at the sintered $TiO_2$ surface 610, adjacent transparent sheet 602 and facing viewer 638 such that when light rays 626 and 628 pass through transparent sheet 602, they are absorbed by particles 616.

When voltage is reversed such that a pixel of display 600 is switched into the light reflecting or light state (shown on the left side of dotted line 620), particles 616 may be moved through perforations 608 of film 606 towards rear electrode surface 614 where they collect at surface 614, adjacent to the backside of film 606 and away from viewer sight 638.

While particles 616 are located at the rear electrode surface 614, incident light rays 622 are reflected back to viewer 638 by the white sintered $TiO_2$ layer 610. This is shown by reflected light ray 624 and it creates a light state for the pixel. The process described herein to switch pixels of display 600 between a light and dark state may be repeated by reversing the voltage and moving particles 616 between the sintered $TiO_2$ surface 610 atop front electrode 604 and rear electrode 614. Rear electrode 614 may be comprised of a TFT or direct drive patterned array or part of a passive matrix electrode grid.

Display 600 may further include walls as shown in display 300 of FIG. 4 that create wells or compartments that separate single or multiple pixels in the display. The walls or cross walls may be designed to create wells or compartments in various desired shapes. The walls may be comprised of a polymeric material and patterned by such techniques as photolithography, embossing or molding. The walls help confine particles 616 and prevent settling and migration of particles 616 that lead to poor display performance.

Any of the display embodiments described herein and variations thereof may be used in such applications as electronic book readers, portable computers, tablet computers, cellular telephones, smart cards, signs, watches, shelf labels, wearables, flash drives, outdoor billboards or outdoor signs comprising a display.

The following examples pertain to further embodiments of the disclosure. Example 1 includes a reflective display, comprising: a transparent outward sheet; a rear support having a rear electrode; a perforated film interposed between the transparent outward sheet and the rear support; a perforated front electrode disposed over the perforated film and substantially tracing the perforated film; a plurality of electrophoretically mobile light absorbing particles suspended in a medium disposed in a cavity defined by the transparent outward sheet and the rear electrode; and a biasing source to communicate with the rear electrode and the front electrode, the biasing source configured to bias the medium to cause the particles to migrate within the cavity.

Example 2 is directed to the reflective display of example 1, wherein the rear electrode further comprises a thin film transistor array or a driven patterned array.

Example 3 is directed to the reflective display of example 1, further comprising a light diffusing layer formed over the transparent outward sheet.

Example 4 is directed to the reflective display of example 1, wherein the biasing source is configured to provide: a first bias to move substantially all of the mobile particles through the perforated film toward the rear electrode to thereby reflect substantially all incoming light rays; and a second bias to collect substantially all of the mobile particles through the perforated film to thereby absorb substantially all incoming light rays.

Example 5 is directed to the reflective display of example 1, further comprising a plurality of walls to form confined spaces therebetween.

Example 6 is directed to the reflective display of example 1, wherein the biasing source forms a substantially undisturbed electric field between the rear electrode and the front electrode.

Example 7 is directed to a reflective display, comprising: a transparent outward sheet; a rear support having a rear electrode surface; a perforated continuous reflective film disposed between the transparent outward sheet and the rear electrode, the continuous reflective film having a transparent and electrically conductive continuous perforated coating to define a front electrode, the perforated continuous film and the conductive coating defining a plurality of pores; a plurality of electrophoretically mobile light absorbing particles suspended in an optically clear medium disposed within a cavity defined by the transparent outward sheet and rear electrode and within the pores; and a voltage source for applying a voltage to the front electrode and the rear electrode.

Example 8 relates to the reflective display of example 7, wherein the rear electrode further comprises a thin film transistor array or a driven patterned array.

Example 9 relates to the reflective display of example 7, wherein the voltage source is configured to apply: a first voltage between the front electrode and the rear electrode to move substantially all of the mobile particles through the perforated film toward the rear electrode to allow for light rays to be reflected at the perforated reflective film surface; and a second voltage between the front electrode and the rear electrode to move substantially all of the mobile particles outwardly through the perforated film and collect at the front electrode surface adjacent the perforated reflective film to thereby absorb the incoming light rays.

Example 10 relates to the reflective display of example 7, further comprising cross walls.

Example 11 relates to a reflective display, comprising: a transparent outward sheet; a rear support having a rear electrode surface; a perforated continuous film disposed between the transparent outward sheet and the rear electrode further comprising a first electrically conductive and light reflective continuous porous layer acting as a front electrode and a second semi-retro-reflective perforated continuous coating; a plurality of electrophoretically mobile light absorbing particles suspended in an optically clear medium disposed within the cavity defined by the transparent outward sheet and the rear electrode and within the perforations of the perforated film, front electrode and semi-retro-reflective coating layers; and a voltage source for applying a voltage across the optically clear medium with suspended light absorbing electrophoretically mobile particles within the cavity.

Example 12 relates to the reflective display of example 11, the rear electrode further comprises a thin film transistor array or a driven patterned array.

Example 13 relates to the reflective display of example 11, wherein the voltage source is switchable to apply: a first voltage between the front electrode and the rear electrode to move substantially all of the mobile particles inwardly through the perforated film toward the rear electrode to thereby allow for light rays to be reflected towards the outward sheet; and a second voltage between the front electrode and the rear electrode to move substantially all of the mobile particles through the perforated film and collect at the semi-retro-reflective surface on top of the front electrode to absorb the light rays passing through the outward sheet.

Example 14 relates to the reflective display of example 11, further comprising cross walls.

Example 15 is directed to a reflective display, comprising: a transparent outward sheet; a rear support having a rear electrode surface; a perforated continuous film located between the transparent outward sheet and the rear electrode further comprising a first conductive continuous perforated coating acting as a front electrode and a second perforated continuous coating comprised of sintered $TiO_2$ particles acting as a reflective surface; a plurality of mobile light absorbing particles suspended in an optically clear medium disposed within the cavity defined by the transparent outward sheet and rear electrode and within the perforations of the perforated film, sintered $TiO_2$ and front electrode layers; and a voltage source for applying a voltage across the optically clear medium with suspended light absorbing mobile particles within the cavity.

Example 16 is directed to the reflective display of example 15, the rear electrode further comprises a thin film transistor array or a driven patterned array.

Example 17 is directed to the reflective display of example 15, wherein the voltage source is switchable to apply: a first voltage between the front electrode and the rear electrode, to move substantially all of the light absorbing electrophoretically mobile particles inwardly through the perforated film toward the rear electrode to allow for light rays to be reflected at the perforated sintered $TiO_2$ surface towards the outward viewing sheet; and a second voltage between the front electrode and the rear electrode, to move substantially all of the light absorbing electrophoretically mobile particles outwardly through the perforated film and collect at the sintered $TiO_2$ surface on top of the front electrode to absorb the light rays passing through the transparent outward sheet.

Example 18 is directed to the reflective display of example 15, further comprising cross walls.

Example 19 is directed to the reflective display of example 15, wherein the biasing voltage source forms a substantially undisturbed electric field between the rear electrode and the front electrode.

Example 20 is directed to a method for switching a pixel from a dark state to a light state, comprising: biasing a top electrode relative to a rear electrode at a first charge to form a substantially undisturbed electromagnetic field in a cavity formed between the first and the second electrodes, the undisturbed electric field to attract a plurality of electrophoretically charged particles to the surface of the top electrode to absorb incident light and thereby form a dark state; and biasing the top electrode relative to the rear electrode at a second charge to cause attraction of the plurality of electrophoretically charged particles to the surface of the rear electrode to thereby form the light state.

Example 21 is directed to the method of example 20, further comprising biasing the top electrode relative to the rear electrode at a second charge to cause migration of the plurality of electrophoretically charged particles through a perforated surface of the top electrode to thereby create the light state.

Example 22 is directed to the method of example 20, further comprising biasing the top electrode relative to the rear electrode to attract a plurality of electrophoretically charged light absorbing particles to the surface of the top electrode.

While the principles of the disclosure have been illustrated in relation to the exemplary embodiments shown herein, the principles of the disclosure are not limited thereto and include any modification, variation or permutation thereof.

What is claimed is:

1. A reflective display, comprising:
    a transparent outward sheet;
    a rear support having a rear electrode;
    a perforated film interposed between the transparent outward sheet and the rear support;
    a perforated front electrode disposed over the perforated film and substantially tracing the perforated film;
    a plurality of electrophoretically mobile light absorbing particles suspended in a medium disposed in a cavity defined by the transparent outward sheet and the rear electrode; and
    a biasing source to communicate with the rear electrode and the front electrode, the biasing source configured to bias the medium to cause the particles to migrate within the cavity.

2. The reflective display of claim 1, wherein the rear electrode further comprises a thin film transistor array or a driven patterned array.

3. The reflective display of claim 1, further comprising a light diffusing layer formed over the transparent outward sheet.

4. The reflective display of claim 1, wherein the biasing source is configured to provide:
    a first bias to move substantially all of the mobile particles through the perforated film toward the rear electrode to thereby reflect substantially all incoming light rays; and
    a second bias to collect substantially all of the mobile particles through the perforated film to thereby absorb substantially all incoming light rays.

5. The reflective display of claim 1, further comprising a plurality of walls to form confined spaces therebetween.

6. The reflective display of claim 1, wherein the biasing source forms a substantially undisturbed electric field between the rear electrode and the front electrode.

7. A reflective display, comprising:
    a transparent outward sheet;
    a rear support having a rear electrode surface;
    a perforated continuous reflective film disposed between the transparent outward sheet and the rear electrode, the continuous reflective film having a transparent and electrically conductive continuous perforated coating to define a front electrode, the perforated continuous film and the conductive coating defining a plurality of pores;
    a plurality of electrophoretically mobile light absorbing particles suspended in an optically clear medium disposed within a cavity defined by the transparent outward sheet and rear electrode and within the pores; and
    a voltage source for applying a voltage to the front electrode and the rear electrode.

8. The reflective display of claim 7, wherein the rear electrode further comprises a thin film transistor array or a driven patterned array.

9. The reflective display of claim 7, wherein the voltage source is configured to apply:
    a first voltage between the front electrode and the rear electrode to move substantially all of the mobile particles through the perforated film toward the rear electrode to allow for light rays to be reflected at the perforated reflective film surface; and
    a second voltage between the front electrode and the rear electrode to move substantially all of the mobile particles outwardly through the perforated film and collect at the front electrode surface adjacent the perforated reflective film to thereby absorb the incoming light rays.

10. The reflective display of claim 7, further comprising cross walls.

11. A reflective display, comprising:
    a transparent outward sheet;
    a rear support having a rear electrode surface;
    a perforated continuous film disposed between the transparent outward sheet and the rear electrode further comprising a first electrically conductive and light reflective continuous porous layer acting as a front electrode and a second semi-retro-reflective perforated continuous coating;
    a plurality of electrophoretically mobile light absorbing particles suspended in an optically clear medium disposed within the cavity defined by the transparent outward sheet and the rear electrode and within the perforations of the perforated film, front electrode and semi-retro-reflective coating layers; and
    a voltage source for applying a voltage across the optically clear medium with suspended light absorbing electrophoretically mobile particles within the cavity.

12. The reflective display of claim 11, the rear electrode further comprises a thin film transistor array or a driven patterned array.

13. The reflective display of claim 11, wherein the voltage source is switchable to apply:
    a first voltage between the front electrode and the rear electrode to move substantially all of the mobile particles inwardly through the perforated film toward the rear electrode to thereby allow for light rays to be reflected towards the outward sheet; and
    a second voltage between the front electrode and the rear electrode to move substantially all of the mobile particles through the perforated film and collect at the semi-retro-reflective surface on top of the front electrode to absorb the light rays passing through the outward sheet.

14. The reflective display of claim 11, further comprising cross walls.

15. A reflective display, comprising:
    a transparent outward sheet;
    a rear support having a rear electrode surface;
    a perforated continuous film located between the transparent outward sheet and the rear electrode further comprising a first conductive continuous perforated coating acting as a front electrode and a second perforated continuous coating comprised of sintered $TiO_2$ particles acting as a reflective surface;
    a plurality of mobile light absorbing particles suspended in an optically clear medium disposed within the cavity defined by the transparent outward sheet and rear electrode and within the perforations of the perforated film, sintered TiO$_2$ and front electrode layers; and a voltage source for applying a voltage across the optically clear medium with suspended light absorbing mobile particles within the cavity.

16. The reflective display of claim 15, the rear electrode further comprises a thin film transistor array or a driven patterned array.

17. The reflective display of claim 15, wherein the voltage source is switchable to apply:

a first voltage between the front electrode and the rear electrode, to move substantially all of the light absorbing electrophoretically mobile particles inwardly through the perforated film toward the rear electrode to allow for light rays to be reflected at the perforated sintered TiO$_2$ surface towards the outward viewing sheet; and a second voltage between the front electrode and the rear electrode, to move substantially all of the light absorbing electrophoretically mobile particles outwardly through the perforated film and collect at the sintered TiO$_2$ surface on top of the front electrode to absorb the light rays passing through the transparent outward sheet.

18. The reflective display of claim 15, further comprising cross walls.

19. The reflective display of claim 15, wherein the biasing voltage source forms a substantially undisturbed electric field between the rear electrode and the front electrode.

20. A method for switching a pixel from a dark state to a light state, comprising:

biasing a top electrode relative to a rear electrode at a first charge to form a substantially undisturbed electromagnetic field in a cavity formed between the top and the bottom electrodes, the undisturbed electric field to attract a plurality of electrophoretically charged particles to the surface of the top electrode to absorb incident light and thereby form a dark state; and biasing the top electrode relative to the rear electrode at a second charge to cause attraction of the plurality of electrophoretically charged particles to the surface of the rear electrode to thereby form the light state.

21. The method of claim 20, further comprising biasing the top electrode relative to the rear electrode at a second charge to cause migration of the plurality of electrophoretically charged particles through a perforated surface of the top electrode to thereby create the light state.

22. The method of claim 20, further comprising biasing the top electrode relative to the rear electrode to attract a plurality of electrophoretically charged light absorbing particles to the surface of the top electrode.

* * * * *